United States Patent
Saito et al.

(10) Patent No.: US 11,960,123 B2
(45) Date of Patent: Apr. 16, 2024

(54) OPTICAL INTERCONNECT STRUCTURE

(71) Applicant: Nippon Telegraph and Telephone Corporation, Tokyo (JP)

(72) Inventors: Yohei Saito, Tokyo (JP); Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 327 days.

(21) Appl. No.: 17/286,763

(22) PCT Filed: Nov. 8, 2019

(86) PCT No.: PCT/JP2019/043839
§ 371 (c)(1),
(2) Date: Apr. 19, 2021

(87) PCT Pub. No.: WO2020/105473
PCT Pub. Date: May 28, 2020

(65) Prior Publication Data
US 2021/0373244 A1 Dec. 2, 2021

(30) Foreign Application Priority Data
Nov. 22, 2018 (JP) .................. 2018-219015

(51) Int. Cl.
*G02B 6/32* (2006.01)
(52) U.S. Cl.
CPC ..................... *G02B 6/32* (2013.01)
(58) Field of Classification Search
CPC ....................................... H02B 6/32

USPC ............................................ 385/33
See application file for complete search history.

(56) References Cited

U.S. PATENT DOCUMENTS

| 4,885,732 A * | 12/1989 | Sunagawa .............. G11B 7/124 |
| 5,694,496 A | 12/1997 | Ando et al. |
| 7,104,703 B2 * | 9/2006 | Nagasaka ............ G02B 6/4214 385/88 |
| 8,319,907 B2 * | 11/2012 | Kim .................. G02F 1/133606 349/57 |

(Continued)

FOREIGN PATENT DOCUMENTS

| CA | 3041974 A1 | 5/2018 |
| JP | H10282350 A | 10/1998 |

(Continued)

OTHER PUBLICATIONS

Abe, "Silica-based waveguide devices for photonic networks," Journal of the Ceramic Society of Japan, vol. 116, No. 210, Sep. 2008, pp. 1063-1070. As discussed in the specification.

(Continued)

*Primary Examiner* — Kaveh C Kianni
(74) *Attorney, Agent, or Firm* — Slater Matsil, LLP

(57) ABSTRACT

An optical connection structure includes a first focus lens arranged between a first light incidence/emission end and an optical element, and a second focus lens arranged between a second light incidence/emission end and the optical element. The first focus lens and the second focus lens are arranged on an optical axis connecting the first light incidence/emission end and the second light incidence/emission end.

16 Claims, 6 Drawing Sheets

(56) References Cited

U.S. PATENT DOCUMENTS

| | | | | |
|---|---|---|---|---|
| 8,616,787 | B2* | 12/2013 | Matsuo | H01L 31/0203 385/92 |
| 9,002,157 | B2 | 4/2015 | La Porta et al. | |
| 9,081,139 | B2* | 7/2015 | Okamura | G02B 6/125 |
| 11,307,366 | B2* | 4/2022 | Hikosaka | G02B 6/3869 |
| 2002/0136507 | A1* | 9/2002 | Musk | G02B 6/4226 385/95 |
| 2003/0007748 | A1* | 1/2003 | Ide | G02B 6/4292 385/88 |
| 2003/0091303 | A1* | 5/2003 | Kami | G02B 6/4277 385/14 |
| 2003/0152336 | A1* | 8/2003 | Gurevich | G02B 6/4246 385/88 |
| 2003/0235371 | A1* | 12/2003 | Shimada | G02B 6/4246 385/50 |
| 2004/0028349 | A1* | 2/2004 | Nagasaka | G02B 6/4204 385/88 |
| 2005/0226566 | A1* | 10/2005 | Sasaki | G02B 6/3806 385/39 |
| 2005/0244111 | A1* | 11/2005 | Wolf | G02B 6/4214 385/14 |
| 2008/0226233 | A1* | 9/2008 | Mine | G02B 6/32 385/55 |
| 2013/0315530 | A1 | 11/2013 | La Porta et al. | |
| 2018/0239096 | A1 | 8/2018 | Houbertz et al. | |
| 2018/0267263 | A1* | 9/2018 | Wang | G02B 6/4228 |
| 2018/0269971 | A1* | 9/2018 | Tang | G02B 6/4214 |
| 2019/0094463 | A1 | 3/2019 | Hasegawa | |
| 2019/0258175 | A1 | 8/2019 | Dietrich et al. | |
| 2019/0265412 | A1* | 8/2019 | Grojo | G02B 6/13 |

FOREIGN PATENT DOCUMENTS

| | | | |
|---|---|---|---|
| JP | H1152293 A | * | 2/1999 |
| JP | H1152294 A | * | 2/1999 |
| JP | H1152316 A | * | 2/1999 |
| JP | 3501235 B2 | | 3/2004 |
| WO | 2017195814 A1 | | 11/2017 |

OTHER PUBLICATIONS

Dietrich et al., "In situ 3D nanoprinting of free-form couplingelements for hybrid photonic integration," Nature Photonics, vol. 12, Apr. 2018, pp. 241-247. As discussed in the specification.

Hibino, "Arrayed-Waveguide-Grating Multi/Demultiplexersfor Photonic Networks," IEEE Circuits & Devices, Nov. 2000, pp. 21-27. As discussed in the specification.

Himeno et al., "Silica-Based Planar Lightwave Circuits," IEEE Journal of Selected Topicsin Quantum Electronics, vol. 4, No. 6, Nov./Dec. 1998, pp. 913-924. As discussed in the specification.

Kawachi et al., "Silica waveguides on silicon and their application tointegrated-optic components," Optical and Quantum Electronics, vol. 22, 1990, pp. 391-416. As discussed in the specification.

Nasu et al., "Temperature insensitive and ultra wideband silica-based dual polarization optical hybrid for coherentreceiver with highly symmetrical interferometerdesign," Optics Express, vol. 19, No. 26, Dec. 2011, pp. B112-B118. As discussed in the specification.

West et al., "All-dielectric subwavelength metasurface focusinglens," Optics Express, vol. 22, No. 21, Oct. 2014, pp. 26212-26021. As discussed in the specification.

* cited by examiner

- Prior Art -

- Prior Art -

OPTICAL INTERCONNECT STRUCTURE

CROSS-REFERENCE TO RELATED APPLICATIONS

This application is a national phase entry of PCT Application No. PCT/JP2019/043839, filed on Nov. 8, 2019, which claims priority to Japanese Application No. 2018-219015, filed on Nov. 22, 2018, which applications are hereby incorporated herein by reference.

TECHNICAL FIELD

The present invention relates to optical connection structures, and more particularly relates to an optical connection structure with an integrated optical element.

BACKGROUND

In order to transfer and process large quantities of optical information quickly and at a low cost, integration of optical devices in the optical circuit is essential. Optical circuits connect a plurality of optical devices with an optical waveguide consisting of a core consisting of a portion of a substrate surface with a high refractive index and a cladding with a lower refractive index than the core. Various devices can be incorporated into such optical integrated circuits, in which optical devices are integrated into the optical circuit.

Materials for optical circuits include ferroelectric materials such as polymers, fused silica, compound semiconductors, silicon, lithium niobite. In addition, optical waveguides for constituting optical circuits include silica-based optical waveguides made mainly of fused silica on a fused silica substrate or a silicon substrate, which are mainly in practical use in the field of communication. The characteristics of silica-based optical waveguides formed on silica-based optical circuits include low propagation loss, high reliability and optical stability, and good workability. Further, since they are highly compatible with silica-based optical fibers, they exhibit low loss and high reliability when connected to a standard silica-based optical fiber for communication.

Currently, optical circuits (PLC: Planar Lightwave Circuits) are being developed, such as Y-branch power splitters composed of silica-based optical waveguides, Mach-Zehnder Interferometers (MZI), optical switches using MZIs, and Arrayed Waveguide Gratings (AWG). These optical circuits are key devices in photonic network systems based on Wavelength Division Multiplexing (WDM) optical transmission systems, which are recently under construction (see Non-Patent Literature 1, Non-Patent Literature 2, and Non-Patent Literature 3).

Apart from silica-based optical circuits, the development of smaller optical circuits using silicon, compound semiconductors, ferroelectric materials, etc. is also progressing in recent years. In order to provide the optical circuit with a function, techniques are often used in which a groove is provided in the optical circuit and an optical element in the form of a thin film is inserted into the provided groove. For example, in order to control polarization of guided light in an optical circuit, a method is often used in which a groove is provided in the optical circuit in which an optical waveguide is formed, and a waveplate imparting a desired phase difference is inserted into the groove.

For example, as shown in FIG. 11, a $\lambda/2$ waveplate 305 is inserted into a groove 304 formed in a silicon substrate 301 and an optical circuit 302 formed on thereupon. The optical circuit 302 is composed of a silica-based optical waveguide 303. The groove 304 is formed from the optical circuit 302 to part of the silicon substrate 301, extending in a direction orthogonal to the waveguide direction of the optical waveguide 303. The groove 304 has, for example, a width of 20 µm and a depth of about 150 µm to 200 µm. By inserting the $\lambda/2$ waveplate 305, which is an optical element, into the groove 304 formed in this way, the optical circuit 302 is provided with functionality.

The $\lambda/2$ waveplate 305 is formed of, for example, a polyimide stretched film. Since the refractive index of a polyimide stretched film is about 0.05, having the polyimide stretched film be of a thickness of about 15 µm lets the polyimide stretched film function as a $\lambda/2$ waveplate for light with a wavelength of 1.5 µm, which is the communication wavelength band.

Since the optical waveguide 303 on the silicon substrate 301 is birefringent, its transmission optical characteristics tend to be polarization dependent. As mentioned above, by inserting the $\lambda/2$ waveplate 305 into the groove 304, it becomes possible to compensate for the polarization dependence of the transmission optical characteristics of the optical waveguide 303 (see Patent Literature 1).

A polyimide stretched film has a fixed polarization direction. Accordingly, in an optical waveguide array in which a plurality of optical waveguides are formed on a substrate, inserting a waveplate with a different polarization direction than the adjacent optical waveguides means inserting a waveplate with a separate polarization direction for each of the optical waveguides.

For example, by using two waveplates with different polarization directions, a polarization beam splitter 400 can be made as shown in FIG. 12. The polarization beam splitter 400 is a waveguide polarization beam splitter including, formed on a substrate 401, an input optical waveguide 402, a Y-branch coupler 403 optically connected to the input optical waveguide 402, and a TE polarization waveguide 404 and a TM polarization waveguide 405 respectively connected to an output of the Y-branch coupler 403. In addition, the polarization beam splitter 400 includes, formed on the substrate 401, a 2×2 multimode interference (MMI) coupler 406 connected to the TE polarization waveguide 404 and the TM polarization waveguide 405, and a TE polarization output waveguide 407 and a TM polarization output waveguide 408 respectively connected to an output of the 2×2 MMI coupler 406.

In the upper surface of the polarization beam splitter 400, a groove 411 is formed so as to cross the TE polarization waveguide 404 and the TM polarization waveguide 405, the groove having a constant depth (specifically a depth of 150 µm to 200 µm) in a direction orthogonal to the waveguide direction of the light in the TE polarization waveguide 404 and the TM polarization waveguide 405. The groove 411 is formed by dicing. Into the groove 411 is inserted a $\lambda/4$ waveplate (90 degrees) 412 so as to cross the TE polarization waveguide 404 and a $\lambda/4$ waveplate (0 degrees) 413 so as to cross the TM polarization waveguide 405.

In the polarization beam splitter 400, the $\lambda/4$ waveplate 412 and the $\lambda/4$ waveplate 413 are inserted between the Y-branch coupler 403 and the 2×2 MMI coupler 406, whereby the TM wave is advanced 90 degrees by the $\lambda/4$ waveplate 412 and the TE wave is advanced −90 degrees by the $\lambda/4$ waveplate 413. By shifting the phases of the two light beams split by the Y-branch coupler 403 by plus and minus 90° and inputting them into the 2×2 MMI coupler 406, only TE polarized light is output by the TE polarization output waveguide 407 and only TM polarized light is output by the TM polarization output waveguide 408 (see Non-Patent Literature 1).

The waveguide polarization beam splitter mentioned above imparts the phase difference between the polarized waves by means of waveplates inserted into both arms, and is therefore able to realize a polarization beam splitter with excellent temperature characteristics. Apart from waveplates, there are also circuits provided with wave multiplexing/demultiplexing functions by the insertion of a wavelength filter, which are used in wavelength multiplex transmission and the like (see Patent Literature 2).

CITATION LIST

Patent Literature

Patent Literature 1: Japanese Patent No. 3501235
Patent Literature 2: Japanese Patent Laid-Open No. 10-282350

Non-Patent Literature

Non-Patent Literature 1: Y. Hibino, "Arrayed-Waveguide-Grating Multi/Demultiplexers for Photonic Networks", IEEE CIRCUITS & DEVICES, pp. 21-27, 2000.
Non-Patent Literature 2: A. Himeno et al., "Silica-Based Planar Lightwave Circuits", IEEE Journal of Selected Topics in Quantum Electronics, vol. 4, no. 6, pp. 912-924, 1998.
Non-Patent Literature 3: M. ABE, "Silica-based waveguide devices for photonic networks", Journal of the Ceramic Society of Japan, vol. 116, no. 10, pp. 1063-1070, 2008.
Non-Patent Literature 4: M. Kawachi et al., "Silica waveguides on silicon and their application to integrated-optic components", Optical and Quantum Electronics, vol. 22, pp. 391-416, 1990.
Non-Patent Literature 5: Y. Nasu et al., "Temperature insensitive and ultra wideband silica-based dual polarization optical hybrid for coherent receiver with highly symmetrical interferometer design", Optics Express, vol. 19, no. 26, pp. B112-B118, 2011.
Non-Patent Literature 6: P. R. West et al., "All-dielectric subwavelength metasurface focusing lens", Optics Express, vol. 22, no. 21, pp. 26212-26221, 2014.
Non-Patent Literature 7: P.-I. Dietrich et al., "In situ 3D nanoprinting of free-form coupling elements for hybrid photonic integration", Nature Photonics, vol. 12, pp. 241-247, 2018.

SUMMARY

Technical Problem

Incidentally, as mentioned above, the groove formed in the optical circuit in which the optical element is to be arranged has a width that is greater than the thickness of the optical element. This is because forming a groove matching the thickness of the optical element, and arranging the optical element into such a groove, requires high precision and is exceedingly difficult. Making the groove wider than the thickness of the optical element makes it easier to form the groove, and also to arrange the optical element in the groove.

For example, as shown in FIG. 13, a substrate 501 and an optical circuit including an optical waveguide 502 has a groove 503 formed across the optical waveguide 502, extending perpendicular to a waveguide direction of the optical waveguide 502. A plate-shaped optical element 504 is arranged in the groove 503. The optical element 504, composed of, for example, a comparatively widely used polyimide waveplate, is 15 µam thick and the width of the groove 503 into which it is arranged is about 20 µm, which is greater than the thickness of the optical element 504. Accordingly, a gap with a width of, for example, 5 µm is formed between the side surface of the groove 503 and the optical element 504.

In this case, for example, since a portion of the groove 503 does not have an optical waveguide structure, light 511 guided by the optical waveguide 502 and emitted from a light-emission end face on the side surface of the groove 503 will be propagated across the groove 503 with diffraction spreading, causing propagation loss. This loss is greater than the loss taking the thickness of the optical element 504 into account. In addition, when the light 511 propagating through the space of the gap enters the optical element 504, loss due to Fresnel reflection also occurs.

In the conventional art, for the purpose of reducing propagation loss and loss due to Fresnel reflection mentioned above, an optical connection structure is adopted in which the gap as described above is filled with a refractive index matching material 505 having a higher refractive index than the core 502a of the optical waveguide 502 and the optical element 504. By filling the gap between the side surface of the groove 503 and the optical element 504 with the refractive index matching material 505, diffraction spreading of the light 511 can be suppressed to an extent, making it possible to reduce the loss.

Meanwhile, for the purpose of realizing a compact and highly functional optical module through size reduction of the optical circuit, optical circuits consisting of an optical waveguide with a large difference in refractive index between the core and the cladding have been receiving attention in recent years. An optical waveguide with a great difference in refractive index between the core and the cladding has an advantage in that the curvature radius of the curved portion of the optical waveguide that changes the waveguide direction of the optical waveguide can be made smaller, so that the optical circuit can be made smaller. By applying the aforementioned optical element to such an optical circuit, the optical integrated circuit can be made smaller. For example, by combining two waveplates with different polarization directions as the optical element in the above optical circuit, the polarization beam splitter can be made smaller.

However, optical waveguides with a large difference in refractive index between the core and the cladding have a flaw in that the loss in the groove in which the optical element is arranged becomes greater, since the angle of diffraction spreading of the light emitted from the optical waveguide end of the aforementioned groove side surface takes a greater value. In order to suppress the increase in loss of an optical waveguide with a large difference in refractive index between the core and the cladding, a technique is used in which a spot size converter for increasing the mode field diameter of the guided light in the optical waveguide near the side surface of the groove is introduced, to reduce loss due to diffraction by increasing the mode field diameter.

However, since the spot size converter itself must often be of a large size in order to convert the mode field diameter to reduce loss, the circuit cannot be made smaller as mentioned above. Further, there is also a flaw in that since the optical element needs to be arranged in the location where the mode field diameter is increased to a desired value by the spot size converter, the groove must be formed with great precision, increasing the difficulty of mounting the optical element.

Embodiments of the present invention were made in order to solve the aforementioned problem, and has an object of arranging an optical element in the middle of an optical waveguide in an optical circuit and reducing propagation loss caused by arranging the optical element in the middle of the optical waveguide, without increasing the difficulty of mounting the optical element in the optical circuit.

Means for Solving the Problem

The optical connection structure according to embodiments of the present invention includes a first optical waveguide having a first light incidence/emission end face formed at one end side; a second optical waveguide having a second light incidence/emission end face formed at one end side and facing the first light incidence/emission end face of the first optical waveguide; an optical element arranged between the first light incidence/emission end face and the light incidence/emission end face; and a focus lens arranged at least one of between the first light incidence/emission end face and the optical element and between the second light incidence/emission end face and the optical element, wherein the focus lens is arranged on an optical axis that connects the first light incidence/emission end face and the second light incidence/emission end face.

In an example configuration of the above optical connection structure, embodiments of the invention includes a resin layer having a refractive index different than a refractive index of the focus lens, the resin layer being filled in at least one of between the first light incidence/emission end face and the optical element and between the second light incidence/emission end face and the optical element, wherein the focus lens is formed embedded in the resin layer.

In an example configuration of the above optical connection structure, embodiments of the invention further include a substrate, on a surface of which the first optical waveguide and the second optical waveguide are formed; and a support unit that is formed on the substrate and supports the focus lens.

In an example configuration of the above optical connection structure, the focus lens is composed of a photocured resin.

In an example configuration of the above optical connection structure, embodiments of the invention include a resin layer being filled in at least one of between the first light incidence/emission end face and the optical element and between the second light incidence/emission end face and the optical element, wherein an interior of the resin layer includes a space, and has a main convex surface that defines the space, the main convex surface protruding towards an optical element side, wherein the main convex surface is arranged on the optical axis and constitutes part of the focus lens.

In an example configuration of the above optical connection structure, the resin layer further, in addition to defining the space, defines an auxiliary convex surface that faces the main convex surface on the optical axis and protrudes towards the main convex surface.

In an example configuration of the above optical connection structure, the resin layer is composed of a photocured resin.

In an example configuration of the above optical connection structure, the first optical waveguide and the second optical waveguide are composed of an optical waveguide formed in a same layer, the first light incidence/emission end face and the second light incidence/emission end face are arranged to face each other across a gap formed in the optical waveguide, and the optical element is arranged in the gap.

Effects of Embodiments of the Invention

As described above, according to embodiments of the present invention, a focus lens is arranged at least one of between the first light incidence/emission end face and the optical element and between the second light incidence/emission end face and the optical element, which achieves the superior effect of making it possible to arrange an optical element in the middle of an optical waveguide in an optical circuit and reduce propagation loss caused by arranging the optical element in the middle of the optical waveguide, without increasing the difficulty of mounting the optical element in the optical circuit.

DETAILED DESCRIPTION OF ILLUSTRATIVE EMBODIMENTS

An optical connection structure according to an embodiment of the present invention is described below.

First Embodiment

Figure 1:
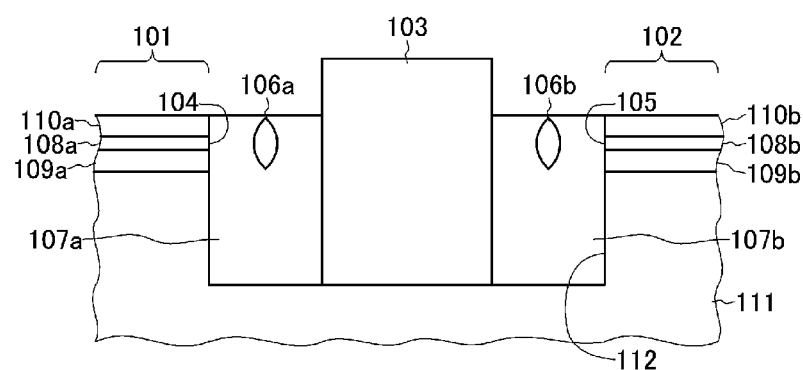
FIG. 1 is a cross-sectional view showing the configuration of an optical connection structure according to a first embodiment of the present invention.

First, an optical connection structure according to a first embodiment of the present invention is described with reference to FIG. 1. This optical connection structure includes a first optical waveguide 101, a second optical waveguide 102, and an optical element 103.

The first optical waveguide 101 includes a first light incidence/emission end face 104 formed at one end side. The first light incidence/emission end face 104 is the boundary face between the interior and exterior of the first optical waveguide 101 at the one end side of the first optical waveguide 101. Light that is guided from the other end of the first optical waveguide 101 will be emitted to the exterior by the first light incidence/emission end face 104. In addition, the second optical waveguide 102 includes a second light incidence/emission end face 105 formed at one end side and facing the first light incidence/emission end face of the first optical waveguide. The second light incidence/emission end face 105 is the boundary face between the interior and exterior of the second optical waveguide 102 at the one end side of the second optical waveguide 102. Light that is guided from the other end of the second optical waveguide 102 will be emitted to the exterior by the second light incidence/emission end face 105.

The first optical waveguide 101 is composed of a first core 108a, a first lower cladding 109a, and a first upper cladding 110a. The second optical waveguide 102 is composed of a second core 108b, a second lower cladding 109b, and a second upper cladding 110b. In addition, the first optical waveguide 101 and the second optical waveguide 102 are formed on a substrate 111. The first optical waveguide 101 and the second optical waveguide 102 are formed by dividing one optical waveguide formed in a same layer on the substrate 111 with a groove (gap) 112. The groove 112 is formed in the substrate 111 to divide the optical waveguide perpendicularly to the waveguide direction of the above optical waveguide. In addition, the groove 112 is formed such that its opposing side surfaces are parallel to each other.

The first light incidence/emission end face 104 and the second light incidence/emission end face 105 are arranged facing each other at the two opposing side surfaces of the groove 112 formed in the substrate 111. In addition, the optical axis of the emitted light that is emitted from the first light incidence/emission end face 104 and the optical axis of the emitted light that is emitted from the second light incidence/emission end face 105 are arranged on the same line.

In addition, the optical connection structure according to the first embodiment includes a first focus lens 106a arranged between the first light incidence/emission end face 104 and the optical element 103, and a second focus lens 106b arranged between the second light incidence/emission end face 105 and the optical element 103. The first focus lens 106a and the second focus lens 106b are arranged on an optical axis connecting the first light incidence/emission end face 104 and the second light incidence/emission end face 105. The first focus lens 106a and the second focus lens 106b are in the shape of so-called convex lenses. The first focus lens 106a and the second focus lens 106b are composed of a photocured resin.

In addition, the optical connection structure according to the first embodiment includes a first resin layer 107a filled in between the first light incidence/emission end face 104 and the optical element 103, and a second resin layer 107b filled in between the second light incidence/emission end face 105 and the optical element 103. The first focus lens 106a is formed embedded in the first resin layer 107a, and the second focus lens 106b is formed embedded in the second resin layer 107b.

The first resin layer 107a is composed of a material with a different refractive index than the first focus lens 106a. Likewise, the second resin layer 107b is composed of a material with a different refractive index than the second focus lens 106b. In the first embodiment, the first resin layer 107a is composed of a material with a lower refractive index than the focus lens 106a. Likewise, the second resin layer 107b is composed of a material with a lower refractive index than the second focus lens 106b. In this case, the first focus lens 106a and the second focus lens 106b are so-called convex lenses. The first resin layer 107a and the second resin layer 107b may be composed of a photocured resin. In addition, the optical element 103 is a plate-shaped element, for example, a λ/2 waveplate. Alternatively, the optical element 103 may be a wavelength filter. By making the optical element 103 a wavelength filter, the optical connection structure is able to split light with a wavelength of, for example, 1.3 μm and 1.5 μm.

According to the first embodiment, light that is guided by the first optical waveguide 101 and emitted by the first light incidence/emission end face 104 propagates through the resin layer 107a toward the optical element 103 with diffraction spreading. The light that propagates with diffraction spreading through the first resin layer 107a is focused by the first focus lens 106a, which reduces the diffraction spreading. As a result, light that has passed through the first focus lens 106a is incident on the optical element 103 with reduced propagation loss.

In addition, the light that has been guided by the optical waveguide 101, emitted by the first light incidence/emission end face 104, entered the optical element 103, and been emitted from the optical element 103, propagates with diffraction spreading through the second resin layer 107b toward the second light incidence/emission end face 105. The light that propagates with diffraction spreading through the second resin layer 107b is focused by the second focus lens 106b, which reduces the diffraction spreading. As a result, light that has passed through the second focus lens 106b is incident on the first optical waveguide 101 through the second light incidence/emission end face 105 with reduced propagation loss.

As described above, according to the first embodiment, the first focus lens 106a is arranged between the first light incidence/emission end face 104 and the optical element 103, and the second focus lens 106b is arranged between the second light incidence/emission end face 105 and the optical element 103, which makes it possible to arrange the optical element 103 in the middle of the optical waveguide of the optical circuit with reduced propagation loss.

The shape and the material composing the first focus lens 106a and the second focus lens 106b are set suitably along with the width of the groove 112 to a focal length with which the greatest reduction effect of propagation loss can be achieved. The lens shape may be spherical, concave, or convex. The lens may also be a cylindrical lens, or a photonic crystal or metasurface (see Non-Patent Literature 6) using a photocured resin. The first focus lens 106a and the second focus lens 106b need only be of a configuration capable of focusing or collimating light to reduce excess loss due to diffraction spreading.

Figure 2:
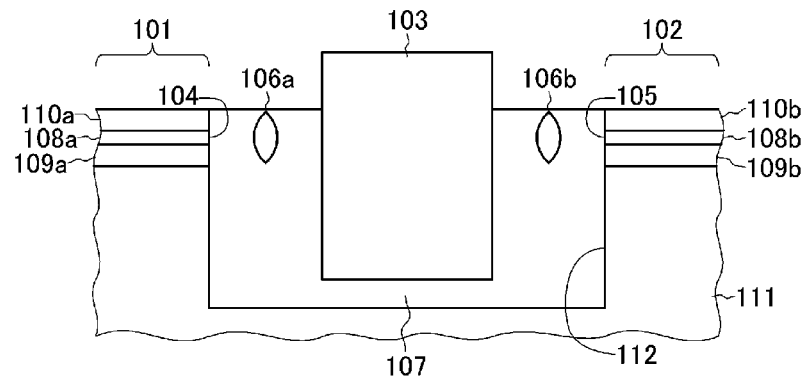
FIG. 2 is a cross-sectional view showing the configuration of another optical connection structure according to the first embodiment of the present invention.

Incidentally, while the optical element 103 is in contact with the bottom of the groove 112 in the optical connection structure described with reference to FIG. 1, the invention is not so limited, and, as shown in FIG. 2, the optical element 103 may be arranged spaced apart from the bottom of the groove 112. In this case, the space between the first light incidence/emission end face 104 and the optical element 103 and the space between the second light incidence/emission end face 105 and the optical element 103 may be filled by a resin layer 107 formed in one piece through the space between the bottom of the groove 112 and the lower surface of the optical element 103.

Second Embodiment

Figure 3:
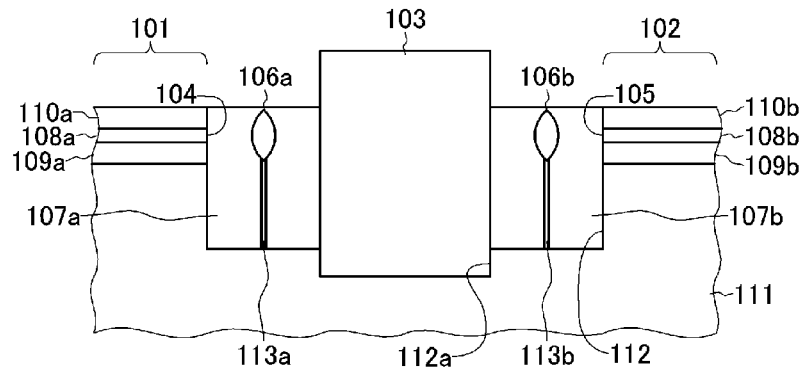
FIG. 3 is a cross-sectional view showing the configuration of an optical connection structure according to a second embodiment of the present invention.

Next, an optical connection structure according to a second embodiment of the present invention is described with reference to FIG. 3. This optical connection structure is the optical connection structure according to the first embodiment described above, further including a first support unit 113a and a second support unit 113b.

The first support unit 113a is formed on the bottom surface of the groove 112 in the substrate 111, and supports the first focus lens 106a. Likewise, the second support unit 113b is formed on the bottom surface of the groove 112 in the substrate 111, and supports the second focus lens 106b. The first support unit 113a and the second support unit 113b are used in the production process of the first focus lens 106a and the second focus lens 106b of the optical connection structure as described below. Also, in the second embodiment, a groove 112a is further formed in the center of the groove 112, and the bottom of the optical element 103 is fitted into the groove 112a. The groove 112a is used to securely arrange the optical element 103 in the groove 112 in the production of the optical connection structure, as described below.

A method for producing the optical connection structure according to the second embodiment is described below. There are several methods for producing an optical connection structure, one of them being an 3D photopolymerization technique using two-photon absorption (see Non-Patent Literature 7). 3D photopolymerization technique is a technique that uses focused laser light to irradiate a photocurable resin to locally cure it, in order to three-dimensionally produce structures such as lenses and optical waveguides from the photocured resin.

By using 3D photopolymerization technique, a lens can be formed in the position in which the lens is to be arranged. As such, compared to a production method in which a separately produced lens is inserted afterward, there is no need for active alignment or the like, which has the advantage of avoiding the trouble of inserting the lens into a small space or damage to the surroundings when inserting the lens. For reference, active alignment is a position alignment technique involving, for example, letting light enter the first optical waveguide 101 and propagate between the first light incidence/emission end face 104 and the second light incidence/emission end face 105, and then observing the change in intensity of the light output from the second optical waveguide 102 to determine the placement of components between the first light incidence/emission end face 104 and the second light incidence/emission end face 105.

Further, when using two-photon absorption, it is possible to cure the photocurable resin using light having a comparatively long wavelength that passes through (is not absorbed by) the photocurable resin for forming the lens, whereby curing of portions other than that constituting the lens can be suppressed. Also, since an output of only a few mW is enough for photocuring using two-photon absorption, it is also easy to produce the structure of the lens without causing any optical damage. Moreover, since commercial 3D photopolymerization devices can produce structures at a resolution of 1 μm or less, which is extremely small, they may be used in the micro-optical system disclosed in Non-Patent Literature 7, and are capable of producing microscopic lenses in extremely small areas.

First, the groove 112 is formed in the substrate 111 by dicing or etching. After forming the groove 112, the groove 112a is further formed. As described below, the groove 112a is formed to prevent the plate-shaped optical element 103 from falling over.

At the stage when the optical element 103 is inserted into the groove 112 and the first resin layer 107a and the second resin layer 107b have not been formed, the optical element 103 may fall over. As described later, the first focus lens 106a and the second focus lens 106b are formed between the groove 112 and the optical element 103, after which the first resin layer 107a and the second resin layer 107b are formed. If the optical element 103 falls over before the first resin layer 107a and the second resin layer 107b are formed, it may cause damage to the first focus lens 106a and the second focus lens 106b. By forming the groove 112a and fitting the bottom of the optical element 103 into the groove 112a, the optical element 103 can be prevented from falling over.

The optical element 103 may be held over the optical waveguide layer in which the first optical waveguide 101 and the second optical waveguide 102 are formed using a jig or the like. The jig is removed after the first focus lens 106a and the second focus lens 106b have been formed, and the first resin layer 107a and the second resin layer 107b have been formed.

Next, a photocurable resin liquid used in 3D photopolymerization is introduced into the interior of the groove 112 in which the optical element 103 is arranged, or in other words, into the regions where the first resin layer 107a and the second resin layer 107b are to be formed. For example, an acrylic resin may be used as the photocurable resin. Alternatively, positioning marks for determining the locations at which to form the first focus lens 106a and the second focus lens 106b are formed in advance, for example, on the upper surfaces of the first optical waveguide 101 and the second optical waveguide 102. If the relative positional relation between, for example, the positioning mark formed on the upper surface of the first optical waveguide 101 and the location at which to form the first focus lens 106a is already known, the location at which to form the first focus lens 106a in the planar direction of the substrate 111 can be determined based on the positioning mark. The positioning marks are formed on the upper surfaces of the first optical waveguide 101 and the second optical waveguide 102 using well-known photolithography and etching techniques.

Alternatively, determining the locations at which to form the first focus lens 106a and the second focus lens 106b may be carried out using an interface detection function of a 3D photopolymerization device used to perform 3D photopolymerization. 3D photopolymerization devices are generally equipped with a function of measuring differences in refractive index to detect interfaces, and determining a position to irradiate with exposure light based on the position of a detected interface.

For example, in a depth direction of the groove 112, the position of the bottom surface of the groove 112 and the position of the upper surface of the first optical waveguide 101 can be detected by the interface detection function mentioned above. Since the thickness of the first lower cladding 109a and the cross-sectional dimension (diameter) of the first core 108a of the first optical waveguide 101 are already known, the position of the optical axis of emitted light that is emitted from the first light incidence/emission end face 104 in the depth direction of the groove 112 can be determined based on the detected position of the bottom surface of the groove 112. Since the first focus lens 106a is to be arranged on the optical axis of the emitted light that is emitted from the first light incidence/emission end face 104, knowing the position of the optical axis in the depth direction of the groove 112 makes it possible to determine the position at which to form the first focus lens 106a in the depth direction.

Further, at the side surface of the groove 112, the refractive index difference between the core 108a and the first lower cladding 109a and second lower cladding 109b allows for the position of the interface thereof to be determined in the planar direction of the substrate 111. By using the interface position in the planar direction of the substrate 111 described above as a reference, the location at which to form the first focus lens 106a in the planar direction of the substrate 111 can be determined.

After determining the coordinates for forming the first focus lens 106a and the second focus lens 106b in the manner described above, the positions at the determined coordinates of the photocurable resin liquid filled in between the optical element 103 and the side surfaces of the groove 112 are irradiated with light to form the first focus lens 106a and the second focus lens 106b. In the 3D photopolymerization process, a predetermined structure is gradually formed in one direction, for example, upwardly from the bottom surface of the groove 112. Therefore, when forming the first focus lens 106a and the second focus lens 106b through 3D photopolymerization, the 3D photopolymerized first focus lens 106a and second focus lens 106b will be in a state of floating in the photocurable resin liquid. Since the photocured first focus lens 106a and second focus lens 106b have a higher density than the uncured photocurable resin liquid, they will sink in the photocurable resin liquid, and deviate from the predetermined formation location.

Therefore, when forming the first focus lens 106a and the second focus lens 106b through 3D photopolymerization, the first support unit 113a and the second support unit 113b are formed first, and the first focus lens 106a and the second focus lens 106b are then formed thereupon. By forming the first support unit 113a and the second support unit 113b in advance, the first focus lens 106a and the second focus lens 106b can be prevented from sinking in the photocurable resin liquid, and the first focus lens 106a and the second focus lens 106b can be secured at the designed positions (coordinates).

Figure 4:
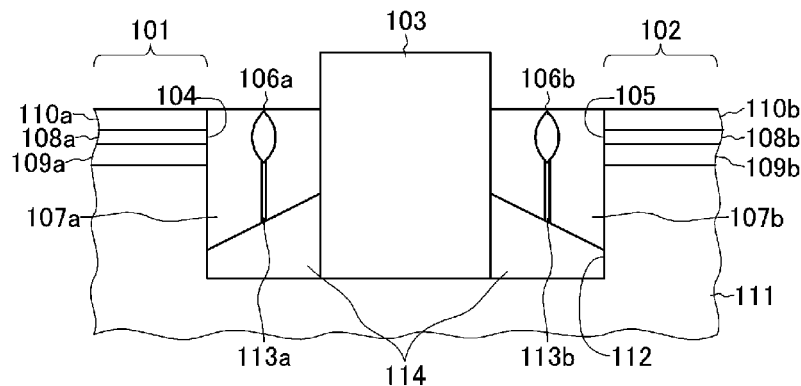
FIG. 4 is a cross-sectional view showing the configuration of another optical connection structure according to the second embodiment of the present invention.

Further, in the 3D photopolymerization process, as shown in FIG. 4, it is also possible to form securing units 114 that secure the optical element 103 at the bottom of the groove 112 before forming the first support unit 113a and the second support unit 113b. By forming the securing units 114 by photocuring a photocurable resin liquid by 3D photopolymerization, the optical element 103 can be prevented from falling over when the uncured photocurable resin liquid is removed as described below. Further, when forming the securing units 114, there is no need to include the groove 112a described with reference to FIG. 3.

When forming the first focus lens 106a and the second focus lens 106b through 3D photopolymerization, the exposure light will be irradiated from above the substrate 111 in a direction toward the bottom of the groove 112. In the 3D photopolymerization process, light is focused on the lens formation position, and thus the beam diameter is larger in front of this position. Therefore, part of the exposure light may hit the upper end portion of the optical element 103 that is above the focus position. The optical element 103 is surrounded by air, and since there is a refractive index difference between the optical element 103 and the surrounding air, when part of the exposure light hits the upper end portion of the optical element 103 in the middle of the light path as mentioned above, shadowing may occur, which shifts the focal point.

This problem can be eliminated by, for example, using a resin or a refractive index matching material with the same refractive index as the optical element 103 for the portion of the optical element 103 that protrudes above the interior of the groove 112 to remove any locations where refractive index differences occur in the entire light path that the exposure light passes through. Next, after forming the first support unit 113a, the second support unit 113b, and the first focus lens 106a and the second focus lens 106b through 3D photopolymerization, the uncured photocurable resin liquid is dissolved and removed using a solvent such as ethanol.

Next, the spaces between the side surfaces of the groove 112 and the optical element 103 where the second support unit 113b, the first focus lens 106a, and the second focus lens 106b are formed are supplied and filled in with a predetermined resin liquid, which is cured to form the first resin layer 107a and the second resin layer 107b. This resin liquid may be composed of, for example, a photocurable resin. Further, this resin liquid may also be composed of a thermosetting resin.

The results of a comparison of the optical connection structure according to the second embodiment described above with a conventional structure is described. In the optical connection structure, the width of the groove 112 was 100 μm, and a polyimide waveplate with a thickness of 15 μm was used as the optical element. Further, a silica-based optical waveguide with refractive difference of 1.5% between the core and the cladding was used for the first optical waveguide 101 and the second optical waveguide 102, and light with a wavelength of 1.55 microns was used. As the conventional structure, the spaces between the optical element 103 and the side surfaces of the groove 112 were filled with a refractive index manufacturing agent. The conventional structure exhibited a loss of about 3 dB, but according to the second embodiment, excess loss could be reduced to about 0.5 dB.

Figure 5:
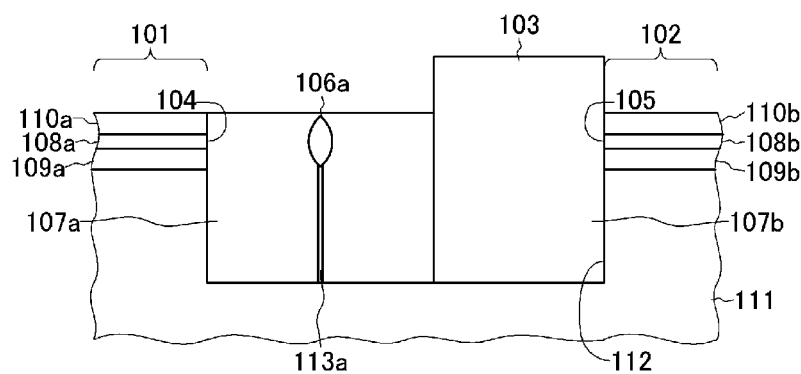
FIG. 5 is a cross-sectional view showing the configuration of another optical connection structure according to the second embodiment of the present invention.

Incidentally, as shown in FIG. 5, it is also possible to form the first focus lens 106a between the first optical waveguide 101 and the optical element 103, and to have the optical element 103 and the second light incidence/emission end face 105 abut each other on the side of the second optical waveguide 102. In this case, the second focus lens 100 and the second resin layer 107b as described in FIG. 1 and FIG. 3 are not formed. Alternatively, it is also possible to form the second focus lens 106b between the second optical waveguide 102 and the optical element 103, and have the optical element 103 and the first light incidence/emission end face 104 abut each other on the side of the first optical waveguide 101.

Doing this makes it possible to arrange the optical element 103 in contact with either one of the side surfaces of the groove 112 when introducing the optical element 103 into the groove 112 in the process of producing the optical connection structure, so that the optical element 103 can be prevented from falling over in the groove 112.

Third Embodiment

Figure 6:
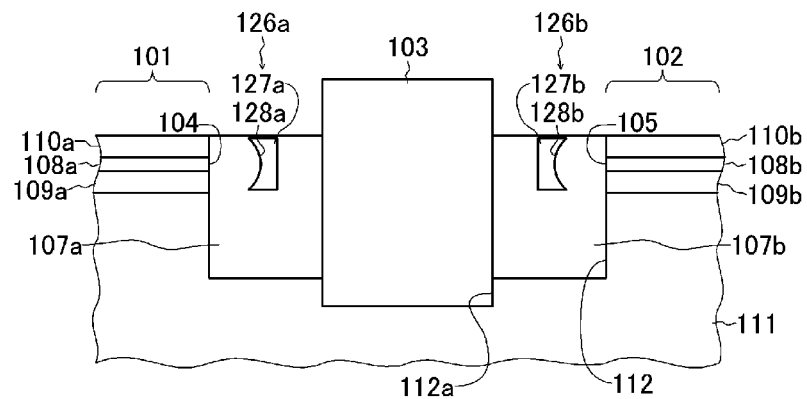
FIG. 6 is a cross-sectional view showing the configuration of an optical connection structure according to a third embodiment of the present invention.

Next, a third embodiment of the present invention is described with reference to FIG. 6. In this optical connection structure, the first focus lens 106a and the second focus lens 106b of the optical connection structure according to the first embodiment described above are configured as a first focus lens 126a and a second focus lens 126b respectively composed of a first main convex surface 128a and a second main convex surface 128b that protrude towards the optical element 103 and define a first space 127a and a second space 127b contained within the first resin layer 107a and the second resin layer 107b.

The first space 127a and the second space 127b are arranged on the optical axis connecting the first light incidence/emission end face 104 and the second light incidence/emission end face 105. The functionality of the first focus lens 126a and the second focus lens 126b is expressed by the first main convex surface 128a and the second main convex surface 128b that define the first space 127a and the second space 127b. The first space 127a and the second space 127b are basically shaped, for example, like rectangular blocks with two opposing sides being parallel to the side surfaces of the groove 112, with the first main convex surface 128a and the second main convex surface 128b being formed on the surfaces of the rectangular blocks that face the side of the optical element 103.

In the third embodiment, the first focus lens 126a and the second focus lens 126b can be formed by introducing the photocurable resin liquid into the areas in which to form the first resin layer 107a and the second resin layer 107b, curing the areas of the introduced photocurable resin other than the first space 127a and the second space 127b, and removing the uncured areas. Curing of the areas of the photocurable resin liquid other than the first space 127a and the second space 127b can be carried out using the 3D photopolymerization technique described above.

Figure 7:
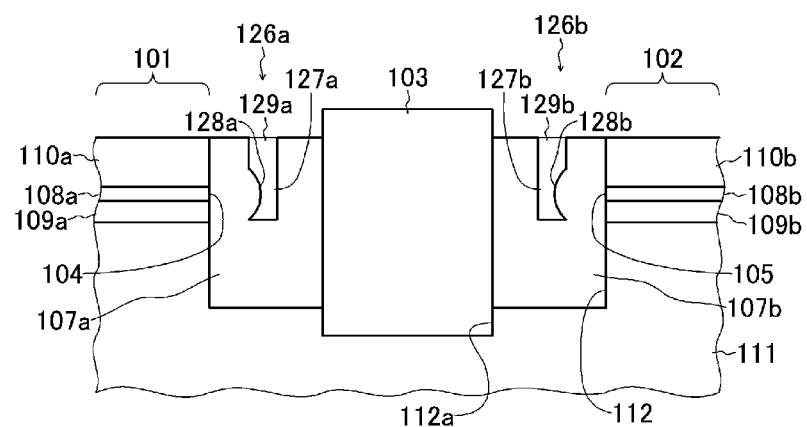
FIG. 7 is a cross-sectional view showing the configuration of another optical connection structure according to the third embodiment of the present invention.

Further, as shown in FIG. 7, by configuring the first space 127a and the second space 127b to include a first opening 129a and a second opening 129b in communication with the exterior in the upper surfaces of the first resin layer 107a and the second resin layer 107b removal of the uncured areas can be carried out through the first opening 129a and the second opening 129b.

According to the third embodiment, the first resin layer 107a and the second resin layer 107b are already formed at the stage in which the first focus lens 126a and the second focus lens 126b are formed, so the first focus lens 126a and the second focus lens 126b will not be damaged by the optical element 103 falling over in the groove 112.

Due to the effect of shadowing mentioned above, it can be difficult to sufficiently cure the photocurable resin liquid by 3D photopolymerization technique in the vicinity of the side surfaces of the groove 112, for example. In this case, areas that cannot be sufficiently cured using 3D photopolymerization technique are cured by being irradiated with a separate exposure light (ultraviolet light). In addition, in cases where it is possible to promote curing of the photocurable resin liquid using heat, areas that cannot be sufficiently cured using 3D photopolymerization technique may also be completely cured by heating.

Further, according to the third embodiment, since the first resin layer 107a and the second resin layer 107b other than the first space 127a and the second space 127b constituting the first focus lens 126a and the second focus lens 126b are cured, they have high mechanical stability. Therefore, even with repeated use of solvent to dissolve and remove uncured portions in order to form the first space 127a and the second space 127b, there is very little damage such as deformation done to the structure.

Because of this, it is easy to, for example, introduce photocurable resin liquid into the formed first space 127a and second space 127b again, to readjust the shapes of the first main convex surface 128a and the second main convex surface 128b by photocurable resin liquid. Adjusting the shapes of the first main convex surface 128a and the second main convex surface 128b allows for adjusting the effect of reducing excess loss due to diffraction spreading.

This kind of shape adjustment of the first main convex surface 128a and the second main convex surface 128b may be done, for example, while guiding light from the first optical waveguide 101 side to the second optical waveguide 102 side and observing changes in intensity of the light output from the emission side of the second optical waveguide 102. The state in which the observed light is the most intense corresponds to the optimal shape of the first main convex surface 128a and the second main convex surface 128b constituting the first focus lens 126a and the second focus lens 126b.

In the third embodiment, when the resin is cured to form the first resin layer 107a and the second resin layer 107b, any deviations from the designed values due to shrinkage caused by the curing or due to nonuniformity of the cured resin can be corrected afterward. Therefore, the third embodiment allows for an increased production yield of the optical connection structure.

Figure 8:
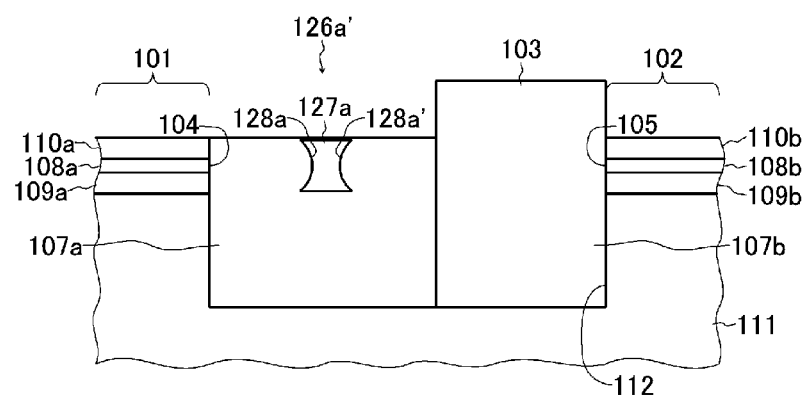
FIG. 8 is a cross-sectional view showing the configuration of another optical connection structure according to the third embodiment of the present invention.

Further, as shown in FIG. 8, it is also possible to form a first focus lens 126a' between the first optical waveguide 101 and the optical element 103, and to have the optical element 103 and the second light incidence/emission end face 105 abut each other on the side of the second optical waveguide 102. In this case, the second focus lens 126b and second resin layer 107b as described in FIG. 6 are not formed. Further, in this case, the first resin layer 107a may define the first space 127a and a first auxiliary convex surface 128a' that faces the first main convex surface 128a on the optical axis and protrudes towards the first main convex surface 128a.

Figure 9:
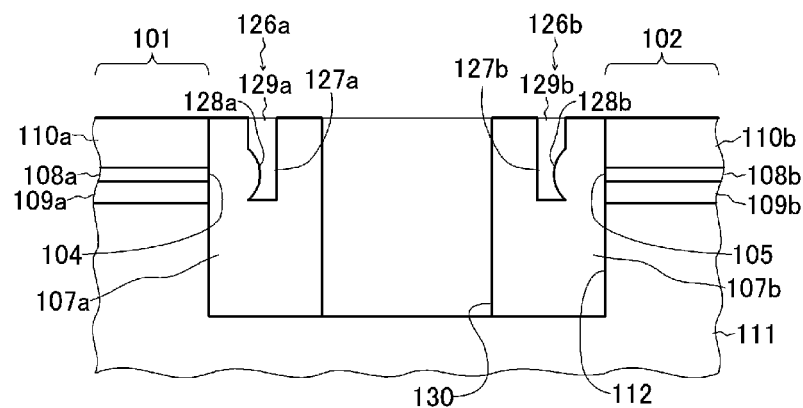
FIG. 9 is a cross-sectional view showing a portion of the configuration of another optical connection structure according to the third embodiment of the present invention.

Further, as shown in FIG. 9, the first space 127a and the second space 127b to constitute the first focus lens 126a and the second focus lens 126b may be formed with a fitting groove 130 in which the optical element 103 is to be arranged between the first resin layer 107a and the second resin layer 107b, after which the optical element 103 may be inserted into the fitting groove 130. By insufficiently curing the side surfaces of the first resin layer 107a and the second resin layer 107b that constitute the fitting groove 130, these portions will be elastically deformable, facilitating insertion of the optical element 103. After inserting the optical element 103, the insufficiently cured areas are completely cured.

Incidentally, in a case where a space is formed in the interior of the resin layer filled in at least one of between the first light incidence/emission end face and the optical element and between the second light incidence/emission end face and the optical element, the space may be filled with a material (liquid, resin) different from that of the resin layer, so that the focus lens can be made by the material filled in the space. For example, in case the space is defined by a main convex surface protruding towards the optical element side, it is filled with a material having a lower refractive index than the resin. On the other hand, in case the space is filled with a resin having a higher refractive index than the resin layer, the space is configured to be defined by a concave surface receding towards the optical element side. In this case, the obtained focus lens is similar to the focus lens described in FIG. 1.

Figure 10:
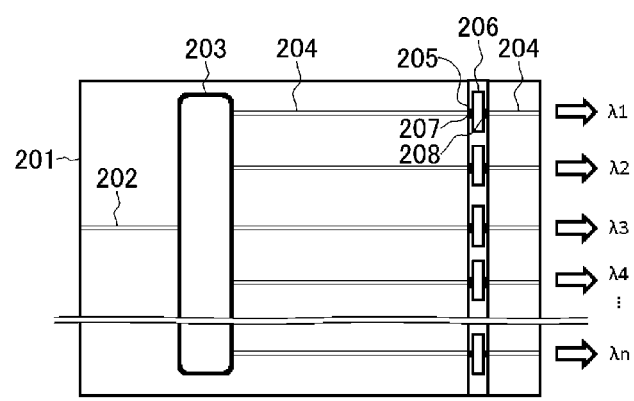
FIG. 10 shows an example configuration of an optical circuit which is an application example of the optical connection structure of the present invention.
Figure 11:
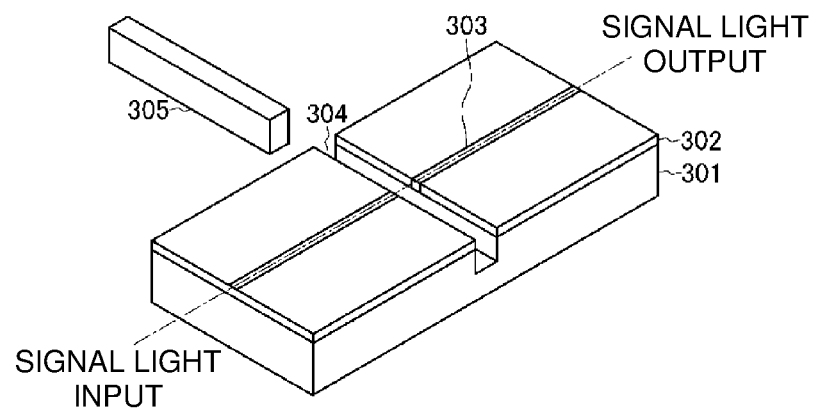
FIG. 11 is a perspective view showing a conventional optical connection structure.
Figure 12:
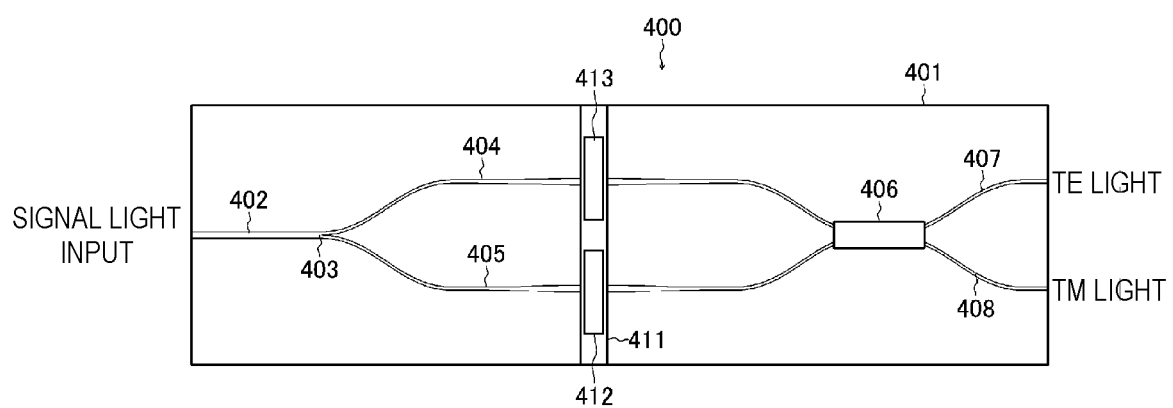
FIG. 12 is a plan view showing an example of an optical circuit using waveplates.
Figure 13:
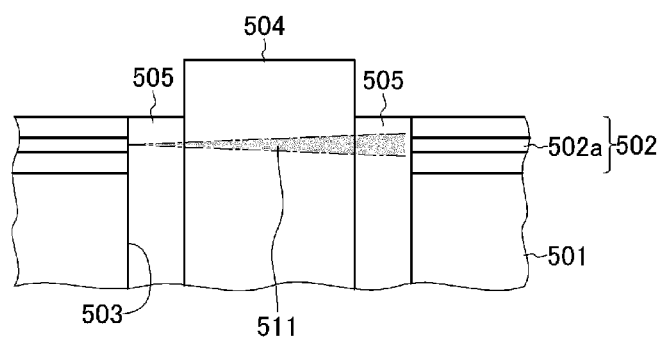
FIG. 13 is a cross-sectional view showing a conventional optical connection structure.

Next, an application example of the optical connection structure according to embodiments of the present invention is described with reference to FIG. 10. The optical connection structure of embodiments of the present invention is applicable to an optical circuit for wavelength division multiplexing in which circuits integrating wavelength filters are arrayed. In this optical circuit, light input into an input optical waveguide 202 formed on a substrate 201 is split into a plurality of optical waveguides 204 by an optical splitter 203. In addition, at a predetermined location on the substrate 201 there is formed a groove 205 that extends perpendicularly to the waveguide direction of the optical waveguides 204. The plurality of optical waveguides 204 are divided by the groove 205.

The groove 205 is provided with wavelength filters 206 corresponding to each of the plurality of optical waveguides 204. Further, in the groove 205, a first optical waveguide 207 and a second optical waveguide 208 are formed between each wavelength filter 206 and the respective side surfaces of the groove 205. The light incidence/emission end faces of the first optical waveguides 207 and the second optical waveguides 208 on the side of the wavelength filter 206 are in contact with the first optical waveguide 207. By providing the first optical waveguides 207 and the second optical waveguides 208 in this way, the wavelength filters 206 can be arranged with reduced propagation loss between the wavelength filters 206 and the optical waveguides 204, and wavelength crosstalk can be reduced.

It is possible to apply as the optical element a comb-shaped waveplate in which the delay imparted by the waveplate periodically changes in the longitudinal direction of the plate. A magneto-optical material may be applied as the optical element. Using a magneto-optical material as the optical element makes it possible to realize optical circuits such as optical isolators.

As described above, according to embodiments of the present invention, a focus lens is arranged between at least one of the first light incidence/emission end face and the optical element or the second light incidence/emission end face and the optical element, makes it possible to arrange an optical element in the middle of an optical waveguide in an optical circuit and reduce propagation loss caused by arranging the optical element in the middle of the optical waveguide, without increasing the difficulty of mounting the optical element in the optical circuit.

It will be readily apparent that the present invention is not limited to the embodiments described above, and that a person with ordinary knowledge in the art can implement several variants and combinations within the technical concept of the present invention.

REFERENCE SIGNS LIST

101 First optical waveguide
102 Second optical waveguide
103 Optical element
104 First light incidence/emission end face
105 Second light incidence/emission end face
106a First focus lens
100 Second focus lens
107a First resin layer
107b Second resin layer
108a First core
108b Second core
109a First lower cladding
109b Second lower cladding
111 Substrate
112 Groove (gap).

The invention claimed is:

1. An optical connection structure comprising:
 a first optical waveguide having a first light incidence/emission end face;
 a second optical waveguide having a second light incidence/emission end face facing the first light incidence/emission end face of the first optical waveguide;
 an optical element between the first light incidence/emission end face and the second light incidence/emission end face;
 a focus lens between the first light incidence/emission end face and the optical element or between the second light incidence/emission end face and the optical element, wherein the focus lens is disposed on an optical axis that connects the first light incidence/emission end face and the second light incidence/emission end face; and
 a resin layer having a refractive index different than a refractive index of the focus lens, the resin layer being filled in between the first light incidence/emission end face and the optical element or between the second light incidence/emission end face and the optical element, wherein the focus lens is embedded in the resin layer.

2. The optical connection structure according to claim 1, further comprising:
 a substrate, wherein the first optical waveguide and the second optical waveguide are disposed on a surface of the substrate; and
 a support unit on the substrate and supporting the focus lens.

3. The optical connection structure according to claim 1, wherein the focus lens is composed of a photocured resin.

4. The optical connection structure according to claim 1, wherein an interior of the resin layer includes a space and has a main convex surface that defines the space, the main convex surface protruding towards the optical element, and wherein the main convex surface is arranged on the optical axis and constitutes part of the focus lens.

5. The optical connection structure according to claim 4, wherein the resin layer further defines an auxiliary convex surface that faces the main convex surface on the optical axis and protrudes towards the main convex surface.

6. The optical connection structure according to claim 4, wherein the resin layer is composed of a photocured resin.

7. The optical connection structure according claim 1, wherein the first optical waveguide and the second optical waveguide are components of an optical waveguide disposed in a same layer, the first light incidence/emission end face and the second light incidence/emission end face are arranged to face each other across a gap in the optical waveguide, and the optical element is disposed in the gap.

8. The optical connection structure according to claim 1, wherein the focus lens is disposed between the first light incidence/emission end face and the optical element and between the second light incidence/emission end face and the optical element.

9. A method comprising:
 providing a first optical waveguide having a first light incidence/emission end face;
 arranging a second optical waveguide having a second light incidence/emission end face to face the first light incidence/emission end face of the first optical waveguide;
 disposing an optical element between the first light incidence/emission end face and the second light incidence/emission end face;

disposing a focus lens between the first light incidence/emission end face and the optical element or between the second light incidence/emission end face and the optical element, wherein the focus lens is disposed on an optical axis that connects the first light incidence/emission end face and the second light incidence/emission end face; and filling a resin layer having a refractive index different than a refractive index of the focus lens between the first light incidence/emission end face and the optical element or between the second light incidence/emission end face and the optical element, wherein the focus lens is embedded in the resin layer.

10. The method according to claim 9, further comprising:
forming the first optical waveguide and the second optical waveguide on a surface of a substrate; and
supporting the focus lens with a support unit on the substrate.

11. The method according to claim 9, wherein the focus lens is composed of a photocured resin.

12. The method according to claim 9,
wherein an interior of the resin layer includes a space and has a main convex surface that defines the space, the main convex surface protruding towards the optical element, and wherein the main convex surface is arranged on the optical axis and constitutes part of the focus lens.

13. The method according to claim 12, wherein the resin layer further defines an auxiliary convex surface that faces the main convex surface on the optical axis and protrudes towards the main convex surface.

14. The method according to claim 12, wherein the resin layer is composed of a photocured resin.

15. The method according to claim 9, wherein the first optical waveguide and the second optical waveguide are components of an optical waveguide formed in a same layer, the first light incidence/emission end face and the second light incidence/emission end face are arranged to face each other across a gap in the optical waveguide, and the optical element is disposed in the gap.

16. The method according to claim 9, wherein the optical element is disposed between the first light incidence/emission end face and the second light incidence/emission end face.

* * * * *